FIG. I

INVENTORS
FREDERICK W. BAUMANN
GEORGE B. DUNN, JR.
BY
THEIR ATTORNEY

May 14, 1968    F. W. BAUMANN ET AL    3,383,529
DYNAMOELECTRIC MACHINE COOLING

Filed Nov. 9, 1965    3 Sheets-Sheet 2

INVENTORS
FREDERICK W. BAUMANN
GEORGE B. DUNN, JR.
BY
THEIR ATTORNEY

May 14, 1968  F. W. BAUMANN ET AL  3,383,529
DYNAMOELECTRIC MACHINE COOLING

Filed Nov. 9, 1965  3 Sheets-Sheet 3

INVENTORS
FREDERICK W. BAUMANN
GEORGE B. DUNN, JR.
BY *James C. Davis Jr.*
THEIR ATTORNEY

United States Patent Office 3,383,529
Patented May 14, 1968

3,383,529
DYNAMOELECTRIC MACHINE COOLING
Frederick W. Baumann, Scotia, N.Y., and George B. Dunn, Jr., Fort Wayne, Ind., assignors to General Electric Company, a corporation of New York
Filed Nov. 9, 1965, Ser. No. 506,942
6 Claims. (Cl. 310—52)

ABSTRACT OF THE DISCLOSURE

A motor cooling system is adapted for use with a motor of the totally enclosed fan-cooled kind. A rotor-mounted fan is disposed inside a perforate end shield that replaces one of the totally enclosed end shields. The fan plate completes a substantial enclosure for the end turn cavity and includes centrifugal blades that force cooling air over the exterior of the motor, which is preferably equipped with cooling fins. Provision is made in the outer peripheral portion of the fan for mixing a controlled quantity of external air with air in the end turn cavity. The air is not propelled directly into the end turn cavity, but instead enters the end turn cavity indirectly by virtue of a pressure differential. The pressure differential is achieved by a cylindrical portion of the stator, preferably part of the end shield portion thereof, that extends partially into the plane of rotation of the fan blades. The fan serves additionally as a separator, which removes heavier air-borne harmful ingredients that would otherwise be propelled into the end turn cavity, by virtue of a dished portion of the fan plate that extends axially outward of the aforementioned cylindrical portion of the stator.

---

This invention relates to dynamoelectric machines comprising a rotor and a stator and to means for cooling the same.

In usual operation of apparatus of the class mentioned, there is continuous generation of heat, especially in the windings and cores of the stator and rotor, and the rate at which such heat is disposed of determines in large part the capacity of the machine. By providing means for increasing the rate at which the rotor and stator part with heat generated therein, it is possible to develop greater useful energy from the same apparatus, or equal energy from a smaller apparatus, each obviously meritorious goals.

Accordingly, a general object of this invention is to provide a dynamoelectric machine having improved cooling means.

Oftentimes, dynamoelectric machines operate in an environment including suspended particles of hostile elements as dust, dirt, moisture, oil, and the like that are prone to affect deleteriously operation of the machine and to shorten its useful lifetime. Stator winding insulation is particularly susceptible to damage by hostile elements as the foregoing. On the other hand, the least complicated efficient cooling means is the kind wherein the rotor and stator are in direct heat exchange relationship to the medium of the surrounding environment, typically air.

Therefore, another object of this invention is to provide a dynamoelectric machine having a cooling system wherein a surrounding cooling medium is circulated in direct heat exchange relationship to the rotor and stator while at the same time exposure thereof to hostile elements in the cooling medium is reduced.

It is desirable for a given dynamoelectric machine to be readily adapted to a plurality of applications, rather than restricted in its usefulness. The inventory, manufacturing and engineering problems of the manufacturer are thereby reduced and the purchaser can more economically modify a previously acquired machine to adapt it from an obsolete application to a new job.

In the foregoing interest, it is still another object of this invention to provide a dynamoelectric machine cooling system that is compatible with otherwise conventional machines and can be readily replaced by or substituted for other cooling systems.

Briefly, the foregoing principal objects are accomplished in accord with one embodiment of this invention by providing a motor cooling system that is adapted for use with an otherwise conventional motor of the totally enclosed fan-cooled kind. A rotor-mounted fan is disposed inside a perforate end shield that replaces one of the totally enclosed end shields. The fan plate completes a substantial enclosure for the end turn cavity and includes centrifugal blades that force cooling air over the exterior of the motor, which is preferably equipped with cooling fins. Provision is made in the outer peripheral portion of the fan for mixing a controlled quantity of external air with air in the end turn cavity. The air is not propelled directly into the end turn cavity, but instead enters the end turn cavity indirectly by virtue of a pressure differential. The pressure differential is achieved by a cylindrical portion of the stator, preferably part of the end shield portion thereof, that extends partially into the plane of rotation of the fan blades. The fan serves additionally as a separator, which removes heavier air-borne harmful ingredients that would otherwise be propelled into the end turn cavity, by virtue of a dished portion of the fan plate that extends axially outward of the aforementioned cylindrical portion of the stator.

While the specification concludes with claims particularly pointing out and distinctly claiming the subject matter which we regard as our invention, it is believed the invention will be better understood from the following description taken in connection with the accompanying drawings wherein corresponding components are similarly designated and in which:

Figure 1:
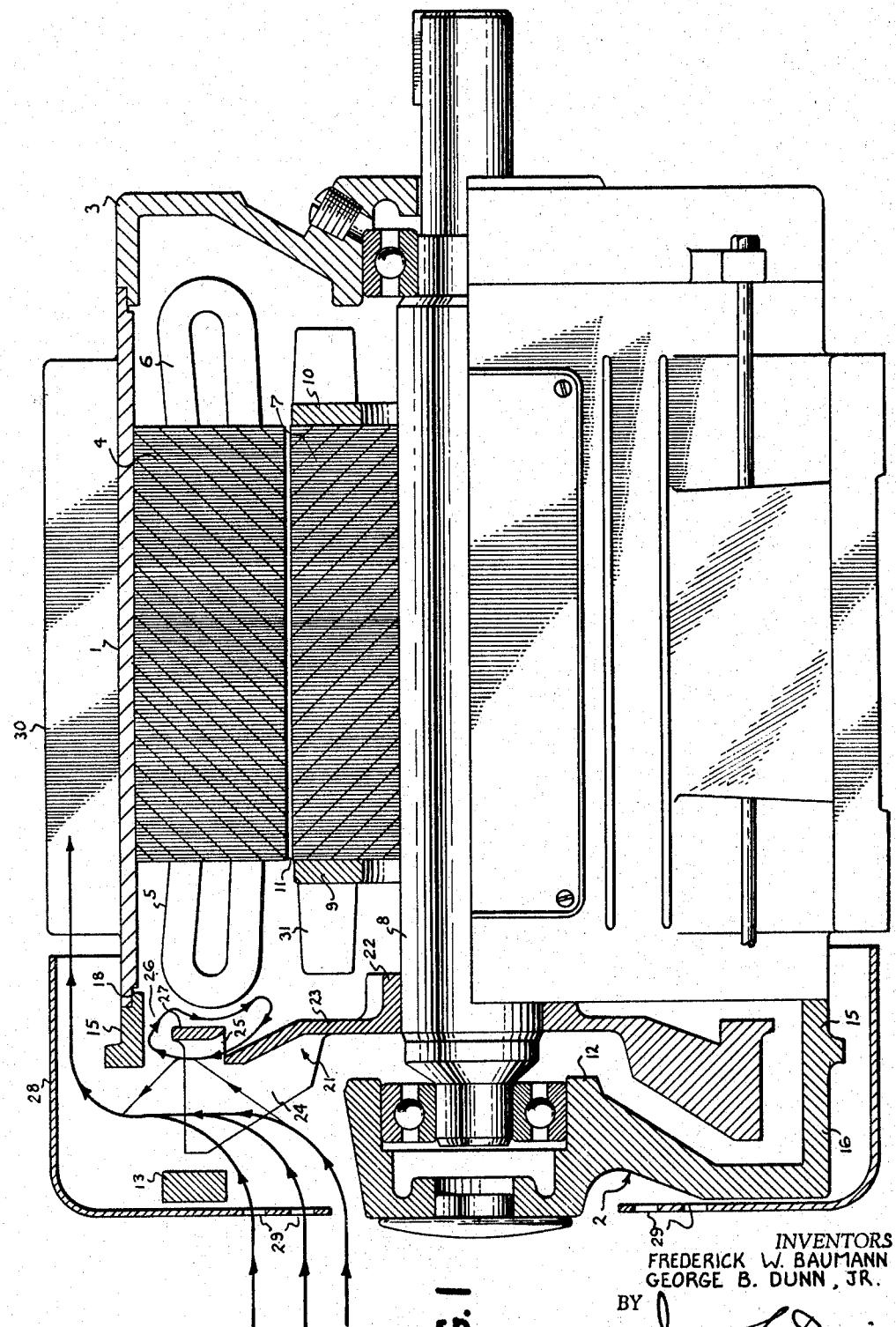
FIGURE 1 is a partial cross section side view of a motor embodying the invention.

For purpose of description, the dynamoelectric machine illustrated in FIGURE 1 is assumed to be a motor. The motor comprises an ordinarily stationary structure, or stator, that includes a cylindrical stator frame 1; a pair of end shields 2 and 3, having respective surfaces mating with the circular end surfaces of frame 1; a laminated stator stack 4 of annular punchings of magnetic material having conductor slots therethrough and being supported inside frame 1; and, a plurality of axially extending electrically conductive members disposed within the conductor slots and projecting axially outward therefrom at both ends to form a plurality of circumferentially spaced winding end turns, as 5 and 6, at respective ends of stator stack 4. The accompanying relatively rotatable member, or rotor, of the motor includes a laminated rotor stack 7 having circular punchings of magnetic material; a shaft 8 extending through and supporting rotor stack 7; and, a plurality of axially extending conductors within rotor stack 7 terminating in end rings 9 and 10 respectively disposed at opposite ends thereof. The rotor shaft 8 is conveniently journaled for rotation within suitable bearings disposed within end shields 2 and 3, thereby rotatably positioning the rotor stack 7 within the bore of stator stack 4, separated therefrom by a narrow air gap 11. Operation of an electric motor of the kind thus far described is well known and those skilled in the art will recognize that a suitable mode of operation and construction is, for example, that of a common induction motor having a polyphase stator winding and a cast squirrel cage rotor winding.

In accord with the present invention, a cooling system for the motor of FIGURE 1 is provided that features means for circulating external cooling air over the surface of the motor, means for circulating internal cooling air within an end turn cavity of the motor, and means for mixing a controlled quantity of external cooling air with the internal cooling air in the end turn cavity. The drive end of the motor including end shield 3, through which shaft 8 projects, is totally enclosed, providing an isolated end turn cavity that communicates with the outside only to a negligible extent through air gap 11. Attention will be focused hereinafter upon the opposite drive end of the motor including end shield 2.

Figure 2:
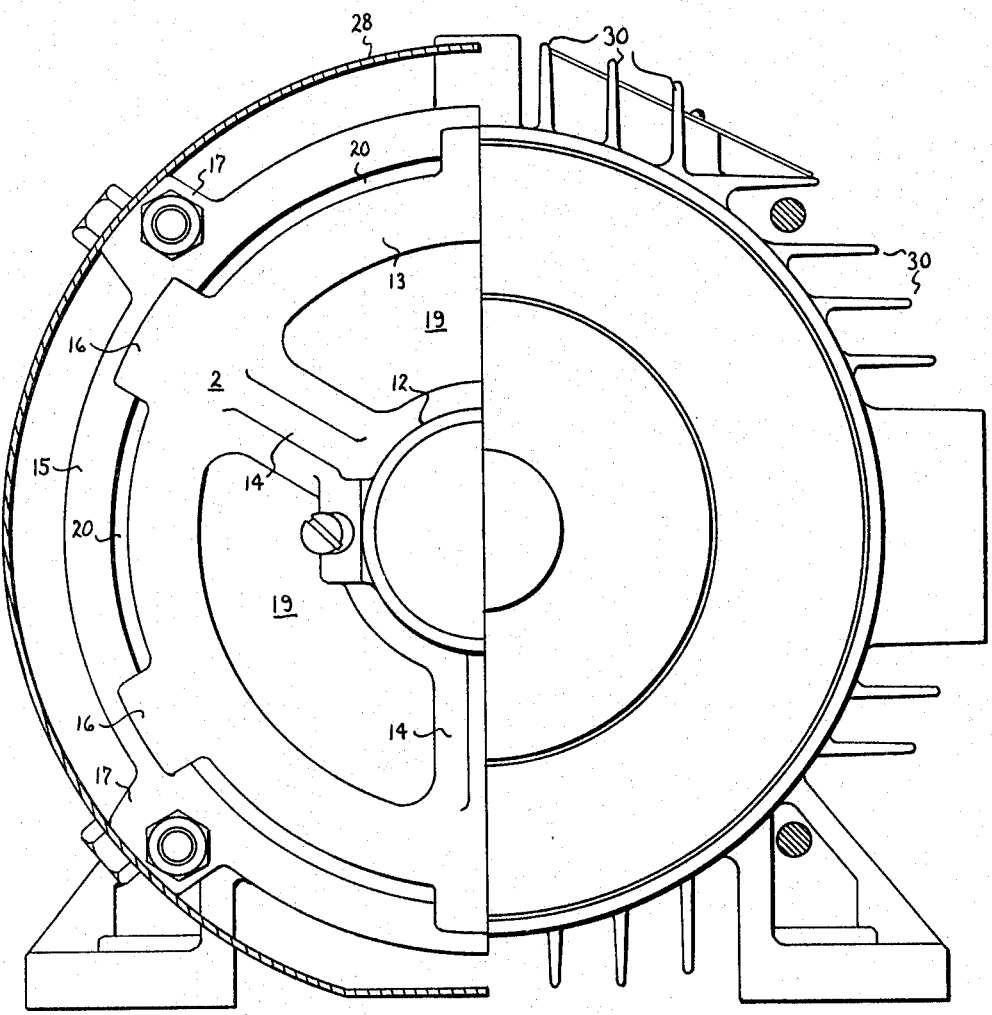
FIGURE 2 is an end view of the motor of FIGURE 1 with the fan cover removed.

Perforate end shield 2 may be considered to replace one of the imperforate end shields of the well-known, totally enclosed fan-cooled kind of motor, although this is not necessarily the case. As more clearly shown in FIGURE 2, end shield 2 includes a centrally disposed bearing support 12 which is secured to a ring 13 by means of a spider having legs, as 14. Ring 13 is in turn attached to a cylindrical member 15 by means of a plurality of circumferentially spaced, axially extending braces, as 16. A plurality of bolt-receiving lugs 17 are provided on the outer peripheral surface of cylindrical member 15, in order to conveniently form means whereby end shield 2 can be rigidly attached to frame 1. Through-bolt construction is preferred wherein end shields 2 and 3 are drawn together, sandwiching frame 1. End shield 2, as thus described, is most advantageously cast as an integral structure and machined around the axially inner surface thereof to provide a rabbeted joint 18 with the complementary surface of frame 1.

In order to obtain maximum cooling flow, end shield 2 is advantageously provided with large perforations limited only by the requirement of mechanical strength and rigidity. Axial air intake passages 19, between legs 14, and radial air outlet passages 20, between braces 16, occupy a substantial proportion of the total area encompassed by the end and peripheral segments, respectively, of end shield 2. The relatively wide axial gap of outlet passages 20 can be seen most clearly in FIGURE 1, between ring 13 and cylindrical member 15.

Circulation of the external cooling medium, in most instances air, is obtained by means of a fan 21. Fan 21 generally includes a hub 22, a fan plate 23 and a plurality of blades, or impellers, 24 carried by the plate 23. Fan 21 is advantageously cast or molded as an integral unit. The fan plate is dished axially outwardly adjacent the radially innermost portion of blades 24 and a plurality of circumferentially extending slots, or narrow slits, 25 provide a radially directed air outlet between blades 24 for a purpose to be more fully set forth hereinafter.

When fan 21 is combined with the other motor components in assembled relationship, hub 22 is mounted on shaft 8 and secured for rotation therewith by any suitable fastening means, as a keyway assembly, interference fit, clamp assembly, or the like. Cylindrical member 15 of end shield 2 lies partially in the plane of rotation of fan blades 24.

Fan plate 23 is imperforate, except for the narrow slots 25 between blades 24 and, accordingly, provides the end wall of a substantially enclosed end turn cavity for end turns 5. Entrance 26 to the end turn cavity is provided by the spacing between the outer peripheral part 27 of plate 23 and the adjacent inner surface of the stator. The latter is the inner surface of cylindrical member 15 in the illustrated embodiment. It will be noted that entrance 26 is substantially wider than the running clearance required between relatively rotatable members; however, when viewed as an air passageway, entrance 26 is relatively narrow. With the exception of the negligible communication effected by air gap 11, no air passageway is provided within frame 1 between the opposing end turn cavities of the motor. The latter feature is specified herein and in the appended claims by referring to an isolated end turn cavity. Similarly, reference to a substantially enclosed end turn cavity means that access thereto by the cooling medium occurs only through orifices of restricted size, as passageways 25 and 26.

A fan cover 28 is advantageously provided which serves to direct the main flow of cooling medium over the external surfaces of the motor and also protects the rotating fan 21 from foreign objects. Cover 28 can be substantially cup-shaped, as shown, and is conveniently fabricated of sheet metal and secured to the stator by bolting or welding, for example, to lugs 17 on end shield 2. In order to permit external air to pass into entrance passages 19 of end shield 2, the inner radial portion of cover 28 is perforated, as at 29. Cover 28 is otherwise imperforate and directs the main cooling flow exiting from outlet passages 20 axially along the external surface of frame 1, that preferably is equipped with heat dissipating fins 30.

To enhance heat transfer from rotor stack 7 and to provide forced circulation of the cooling medium within the substantially enclosed end turn cavity, there are provided a plurality of centrifugal impellers 31 on the rotor. Impellers 31 are disposed radially inward of end turns 5 and air outlet 25 and can be fabricated advantageously as an integral component of the rotor winding, particularly in the case where the rotor winding is cast into the rotor stack 7. The latter technique is oftentimes employed in construction of squirrel cage rotors, for example.

During useful operation of the dynamoelectric machine described, the rotor assembly revolves rapidly relative to the stator assembly which is ordinarily fixed, or stationary. Accordingly, fan 21, that is mounted on rotor shaft 8, and impellers 31, which are secured to rotor stack 7, both revolve, relative to the stator components.

Figure 4:
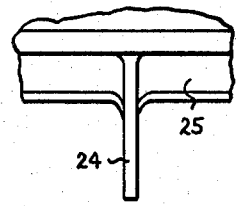
FIGURE 4 is a partial top view of the fan of FIGURE 3.
Figure 3:
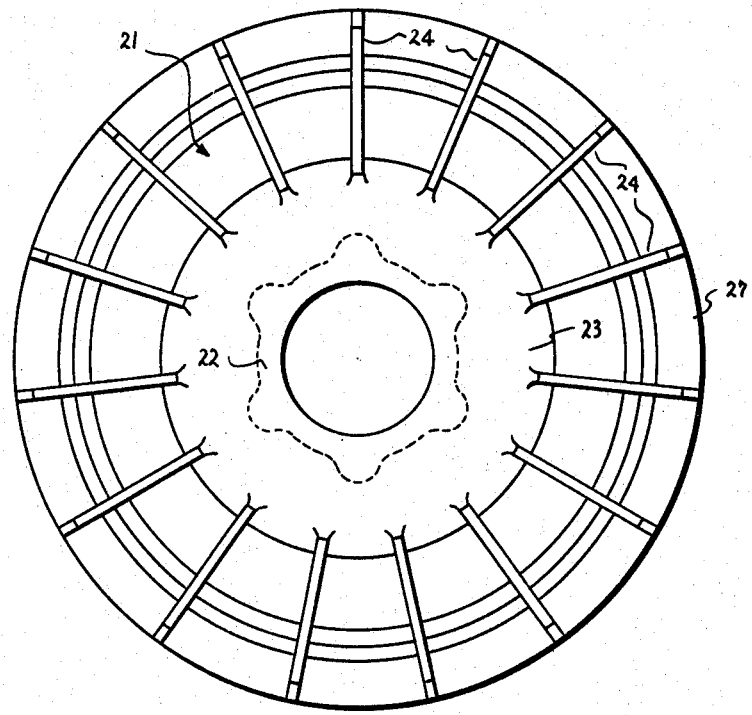
FIGURE 3 is a plan view of the shaft-mounted fan of FIGURE 1.

Primary cooling fluid flow is caused by fan 21 in conjunction with end shield 2 and cover 28. As best seen in FIGURES 3 and 4, blades 24 project perpendicularly from fan plate 23 and extend radially. Thus, blades 24 force a cooling flow radially outwardly through outlet passages 20. Cover 28 subsequently directs the flow axially along fins 30. The fluid is replenished through perforations 29 and entrance passages 19, to provide continuous circulation. It is important to note that operation of the part of the cooling system thus far described is independent of the direction of rotation of the rotor relative to the stator. This feature is sometimes required and is present through the cooling system of this invention.

Rotor-mounted impellers 31 provide a centrifugal fan, as did blades 24, and for circulation of air around and through end turns 5. Impellers 31 also serve as a heat transfer surface to the substantially enclosed coolant. In this connection, it will be noted that a significant proportion of the heat extracted from the other end of the motor, in the event the other end has an imperforate end shield, as illustrated, is transferred to the coolant circulated by impellers 31. Heat is conducted from the other end of the motor in such case to end turns 5 and impellers 31 by the electrical conductors comprising the axially extending windings of the machine. The usual electrical conductor materials, as copper and aluminum, are excellent conductors of heat.

While the foregoing discussion of cooling system operation has been concerned with the means for circulating external coolant and the means for circulating internal coolant, the following relates to means for controlled mixing of the two bodies of coolant so that efficiency of heat transfer is greatly improved by direct convection from the end turn cavity to the surrounding atmosphere. Toward this end, a portion of the stator, preferably the end shield as in the illustrated embodiment, includes a cylindrical member 15 that extends partially into the plane of rotation of centrifugal blades 24 thereby creating a local region of relatively high pressure adjacent entrance 26. Some of the coolant in this region of relatively high pressure flows into the end turn cavity which is at a lower pressure and displaces coolant flowing through slotted outlets 25 to the outside of fan plate 23. Some of the coolant from outlets 25 joins the main stream out through passages 20 while another portion is recirculated in a churning annulus of coolant encircling outer peripheral part 27 of fan plate 23. Because impellers 31 are spaced a substantial distance axially inward of fan plate 23 and are shrouded by, or within the plane of, end turns 5, they do not disrupt the aforementioned mixing flow. It is important to note that the flow of mixing air is indirectly caused by a difference in pressure, rather than directly by a velocity component. To this end, cylindrical member 15 is adapted to require a sharp or abrupt change in incoming air direction that advantageously is at least equal to a right angle. When the coolant is propelled into the end turn cavity, as with many prior art systems, the delicate end turns are oftentimes bombarded with harmful foreign particles, or at least such particles are foced into the end turn cavity. This invention obviates the violent coolant propulsion of the prior art and substitutes a gentle end turn scrubbing flow of essentially equal effectiveness and which is amenable to separation of harmful particles from the coolant.

The axially outwardly dished portion of plate 23 shields air outlet 25 in fan 21 from the main coolant flow and also serves as a centrifugal slinger which propells solid and liquid particles in the coolant directly out through outlet passage 20, rather than permitting such particles to mingle in the end turn cavity flow. To the latter end, the peripheral extremity of the dished portion advantageously extends axially outward of cylindrical member 15, although this is not essential because of the slight axially outwardly directed component of main coolant velocity imparted by the dished portion that extends a substantial radial distance along blades 24.

The dynamoelectric machine cooling system described is equally applicable to motors and generators. The system is readily adapted to otherwise conventional machines and provides direct convective heat transfer with a surrounding medium while limiting entrance of harmful ingredients to the end turn cavity. In the illustrated embodiment, the drive end of the machine is shown as totally enclosed. This is advantageous in many cases because the drive end usually is subjected to the most adverse environmental conditions. It will be understood, however, that the invention can be used in combination with other kinds of cooling systems and that either or both ends of a machine can be cooled in the manner set forth herein for the opposite drive end.

In view of the above, it will be apparent that many modifications and variations are possible in light of the foregoing teachings. It therefore is to be understood that within the scope of the appended claims, the invention can be practiced other than as specially described.

What we claim as new and desire to secure by Letters Patent of the United States is:

1. A dynamoelectric machine comprising: a stator and a rotor each equipped with windings adapted for electromagnetic cooperation with each other to provide relative rotation therebetween; a shaft for said rotor and a fan mounted on said shaft for rotation therewith, said fan comprising a fan plate and a plurality of circumferentially spaced centrifugal fan blades projecting axially outward from said plate; a perforate end shield component of said stator having axial coolant passages outward of said fan; a plurality of circumferentially spaced radial coolant outlet passages in said stator, said outlet passages being disposed radially outward of said fan and extending partly into the plane of rotation of said fan blades, a cylindrical portion of said stator disposed axially inward of said outlet passages and extending partly into the plane of rotation of said fan blades; a substantially enclosed and isolated end turn cavity completed by said fan plate; an annular coolant entrance to said cavity between the outer periphery of said fan plate and said cylindrical portion of the stator; and, circumferentially extending slots through said fan plate between said fan blades to provide coolant outlets from said cavity, whereby a relatively high pressure region of coolant is established in the vicinity of said entrance to the cavity in response to rotation of said rotor so that mixing of external coolant with internal coolant in said cavity is achieved without directly propelling external coolant into said cavity.

2. The dynamoelectric machine of claim 1 wherein said air outlet passages in the stator and the cylindrical portion of said stator extending partly into the plane of rotation of said blades are both in said end shield component of said stator, and said end shield is readily removable, whereby said machine can be adapted conveniently to other cooling systems.

3. The dynamoelectric machine of claim 2 wherein said fan plate includes an axially outwardly dished portion extending radially outwardly into said blades, whereby solid and liquid particles tend to be separated from the coolant flow into said cavity.

4. The dynamoelectric machine of claim 3 wherein the end of said machine opposite said end shield is totally enclosed, said stator is equipped with axially extending heat dissipating fins on the exterior thereof, a substantially cup-shaped fan cover is mounted on said stator in outwardly spaced relationship to said end shield for directing coolant from said coolant outlet passages axially along the external surface of said stator, and said rotor is equipped with auxiliary centrifugal fan blades disposed within said cavity.

5. In a dynamoelectric machine having a stator and a rotor each equipped with windings and adapted for electromagnetic cooperation with each other, the winding of said stator including a plurality of axially extending end turns disposed circumferentially near one end of said machine, the improvement of a cooling system for said end of said machine comprising in combination:
   (a) means for forcing circulation of cooling air over the external surface of said stator, said means comprising: a centrifugal fan mounted axially outward of said end turns on said rotor for rotation therewith, axial air intake means and radial air outlet means is said stator and in communication with said fan, and an air-directing baffle;
   (b) means for circulating cooling air among said end turns comprising; a substantially closed end turn cavity bounded in part by said fan, forced air circulation means on said rotor disposed axially outward of said rotor and radially inward of said end turns for circulating air within said cavity; and
   (c) means for mixing air within said cavity and external air, said means including a stationary circular shroud on said stator spaced from and enclosing a portion of said fan at the radially outward extreme thereof for developing a local region of air at a relatively high pressure communicating with said cavity through the space between said fan and shroud, and an outlet passage through said fan for extracting air from said cavity into a region of relatively low pressure.

6. The machine of claim 5 wherein said shroud is disposed relative to said fan to provide a sharp change in direction of air entering said cavity.

References Cited

UNITED STATES PATENTS 2,604,501   7/1952   Wightman _____ 310—63

MILTON O. HIRSHFIELD, *Primary Examiner.*

R. W. TEMPLETON, *Assistant Examiner.*